United States Patent [19]

Buddenhagen

[11] 4,247,309

[45] Jan. 27, 1981

[54] PROCESS AND APPARATUS FOR DEGASIFYING A LIQUID

[75] Inventor: Uwe Buddenhagen, Munich, Fed. Rep. of Germany

[73] Assignee: M.A.N. Maschinenfabrik Augsburg-Nurnberg Aktiengesellschaft, Munich, Fed. Rep. of Germany

[21] Appl. No.: 946,780

[22] Filed: Sep. 28, 1978

Related U.S. Application Data

[63] Continuation-in-part of Ser. No. 917,294, Jun. 20, 1978, abandoned, which is a continuation-in-part of Ser. No. 775,541, Mar. 8, 1977, abandoned.

[30] Foreign Application Priority Data

Mar. 11, 1976 [DE] Fed. Rep. of Germany ....... 2610109
Mar. 20, 1976 [DE] Fed. Rep. of Germany ....... 2611992
Feb. 2, 1977 [DE] Fed. Rep. of Germany ....... 2704207

[51] Int. Cl.³ ............................................. B01D 45/12
[52] U.S. Cl. ......................................... 55/36; 55/203; 123/41.54; 165/114
[58] Field of Search ...................... 55/36, 46, 52, 159, 55/177, 191, 204, 205, 203; 165/114; 123/41.54

[56] References Cited

U.S. PATENT DOCUMENTS

| 3,195,294 | 7/1965 | Verdura | 55/159 |
| 3,912,468 | 10/1975 | Tsuchiya et al. | 55/203 |
| 3,996,027 | 12/1976 | Schnell et al. | 55/36 |
| 4,075,984 | 2/1978 | Kirchgessner | 123/41.54 |

*Primary Examiner*—Bernard Nozick
*Attorney, Agent, or Firm*—Scully, Scott, Murphy & Presser

[57] ABSTRACT

A process and apparatus for the separation of gas bubbles from a liquid which is subjected to a flow, in which a flowing portion of the liquid is brought into contact with an arcuate wall at an opening and deflected into a relatively quiescent liquid along a surface, so as to produce a vortex at the contact surface between the two liquid portions in such a manner as to project the vortex into the flowing portion as well as into the relatively quiescent portion, and whereby its axis extends in parallel or almost parallel to the contact surface, so that gas bubbles will be conducted from the flowing liquid portion by the vortex into the relatively quiescent liquid portion, from which the gas bubbles will then separate out under the influence of buoyant force.

3 Claims, 13 Drawing Figures

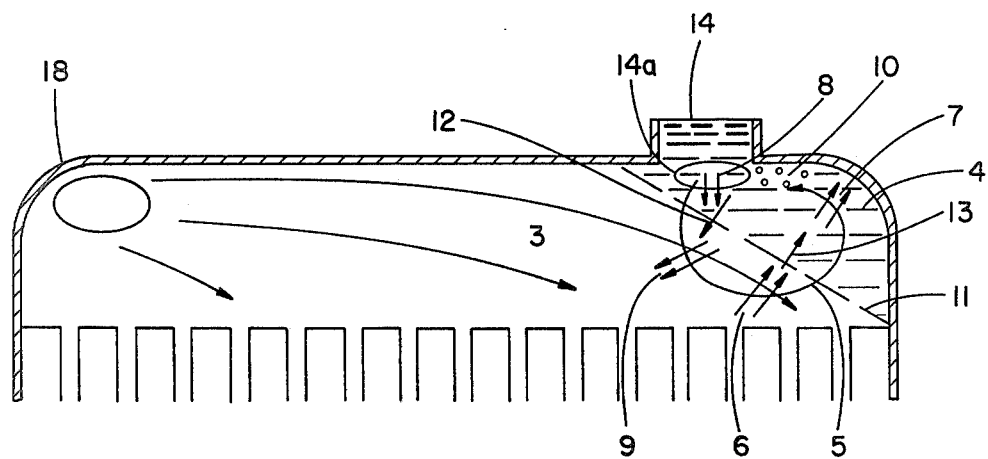
FIG. 3
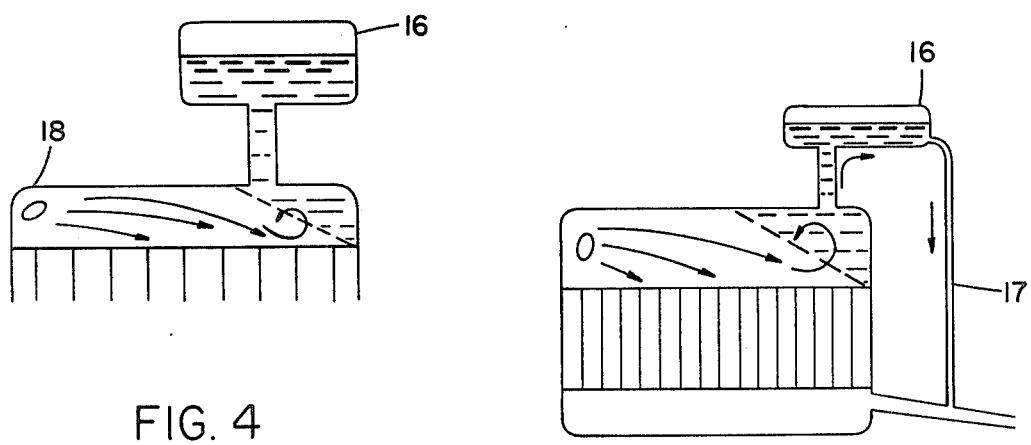
FIG. 4
FIG. 5

PROCESS AND APPARATUS FOR DEGASIFYING A LIQUID

This application is a continuation-in-part application of Ser. No. 917,294 filed June 20, 1978, which is a continuation application of Ser. No. 775,541 filed Mar. 8, 1977, both now abandoned.

BACKGROUND OF THE INVENTION

1. Field of the Invention

The present invention relates to a process and an arrangement for the degasifying of a liquid.

The occurrence of gas bubbles in a liquid-conveying installation can lead to the damaging of this installation. Thus, it is desirable to effect a separation of the gas bubbles from the liquid, however, it provides difficulties when the flow velocity of the liquid is so high that the gas bubbles no longer retain the capacity to rise to the surface of the flowing liquid due to their lower specific weight and to spontaneously separate out, or wherein the gas molecules which are present at the free upper surface of the liquid are pulled along by the flow. In contrast therewith, in a quiescent liquid the gas bubbles can rise upwardly due to their lower specific weight and can spontaneously separate themselves from the liquid. The difficulties which are encountered in the separation of gas bubbles from a flowing liquid can be avoided when the velocity of the liquid flow is reduced to a value at which the gas bubbles will rise upwardly due to their lower specific weight and will spontaneously or naturally separate from the liquid. Such a reduction in the flow velocity can be attained when there is a corresponding expansion of the flow cross-section. Because of the thereby resulting increased dimensions of the constructional elements which are passed through by the liquid, this solution to the problem is not always practical in use.

2. Discussion of the Prior Art

The separation of gas bubbles from a flowing liquid can also be effected when the flowing liquid is set in rotation so that the gas bubbles, due to their lower specific weight, will collect in a region through the effect of centrifugal force from which they can then be conducted away under the effect of their buoyant force. Examples of earlier publications in which this solution to the problem is disclosed are German Laid-Open Patent Specification Nos. 1,904,632 and 2,105,926 and German Petty Patent No. 6,948,644. A disadvantage encountered in this solution is that energy must be expended in order to be able to displace the flow into a rotation of that kind.

SUMMARY OF THE INVENTION

Accordingly, it is an object of the present invention to provide a process for the separation of gas bubbles from a liquid which is subjected to a flow, in which no or only a small additional energy demand is required.

The object set forth by the present invention is attained in that a flowing portion of the liquid is brought into contact with a relatively quiescent portion of the liquid along a surface, and that there is produced a vortex at the contact surface between the two liquid portions in such a manner as to project into the flowing portion as well as into the relatively quiescent portion and whereby its axis extends in parallel or almost parallel to the contact surface, so that gas bubbles will be conducted from the flowing liquid portion by the vortex into the relatively quiescent liquid portion, from which the gas bubbles will then separate out under the influence of the buoyant force.

Preferably, the relatively quiescent portion of the liquid is substantially smaller than the flowing liquid portion.

The conveyance of the gas bubbles from the flowing portion into the relatively quiescent portion takes place inasmuch as the vortex effects, on the one hand, between itself and the flowing liquid portion and, on the other hand, between itself and the relatively quiescent liquid portion, an intensive mass exchange and, in addition thereto, produces in its zone an intensive cross-flow of the bubble-laden and, respectively, degasified liquid.

Two possibilities are present for the reconveyance of the degasified liquid into the flowing liquid portion:

The entire degasified liquid is reconveyed into the flowing liquid portion as a result of the mass exchange and the cross-flow in the zone of the vortex, or only a portion of the degasified liquid is reconveyed into the flowing liquid portion as a result of the mass exchange and crossflow and the other portion is reconveyed into the flowing liquid portion while bypassing the vortex. The last-mentioned possibility indicates that the relatively quiescent liquid component is conducted through a chamber so that the gas bubbles are conveyed thereto. Such a low flow velocity reigns in this chamber or space that the gas bubbles will rise to the surface and will thus be able to spontaneously separate out of the liquid. Thereafter, the degasified liquid is reconveyed into the flowing liquid portion while bypassing the vortex.

Valid for the dimensioning of the contact surface between two liquid portions is that, on the one hand, it be sufficiently large so as to ensure the mass exchange between the two portions and, on the other hand, it be so small as to avoid that excessively high flow velocities will occur in the relatively quiescent liquid portion which could influence or even completely inhibit a natural or spontaneous separation out of the gas bubbles.

The present invention also contemplates an arrangement for the carrying out of the inventive process, which is characterized by means of two chambers or spaces which are separated by a wall, which are in communication with each other through the intermediary of a window formed in the wall, and by means for generating the vortex in the window whereby, during the operation of the arrangement, one of the two chambers receives the flowing liquid portion and the other chamber the relatively quiescent portion of the liquid, and wherein the contact surface between the two portions lies in the plane of the window, whose rim defines the contact surface.

If only a part of the degasified liquid resulting from the mass exchange and the cross-flow is to be reconveyed into the flowing portion, it is expedient that the other chamber be divided into two subchambers or subspaces which are interconnected by means of a conduit so that, during operation of the arrangement, the gas bubbles from the one subchamber be conveyed through the conduit into the other subchamber in which they will then separate out of the relatively quiescent liquid portion through the effect of the buoyant force. The reconveyance of the degasified liquid in the other subchamber is then effected through a further conduit to which there is connected the first subchamber. In this manner there is thus carried out a constantly continuing degasification of the flowing liquid portion.

The present invention is preferably utilized in the cooling circuit for a liquid-cooled internal combustion engine and, namely, in such a manner wherein the two chambers are located in the upper radiator of a cooler which is arranged in this cooling circuit, and wherein the other chamber serves as an expansion tank. When the other chamber, which during operation receives the relatively quiescent liquid portion, is divided into two subchambers, then the one chamber and the other subchamber of the other chamber are arranged in the upper radiator of the cooler and the other subchamber is arranged in an expansion tank of the cooling circuit.

BRIEF DESCRIPTION OF THE DRAWINGS

Reference may now be had to the following description of preferred embodiments of the invention, taken in conjunction with the accompanying drawings; in which:

FIG. 3 shows an alternative construction of the upper cooler portion illustrated in FIG. 2;

FIG. 4 shows the upper cooler portion illustrated in FIG. 3 in connection with an expansion tank without an additional return conduit for the degasified liquid;

FIG. 5 illustrates a section through the entire cooler which is only partially illustrated in FIG. 3, with an expansion tank having an additional return conduit for the degasified liquid;

DETAILED DESCRIPTION

Figure 1:
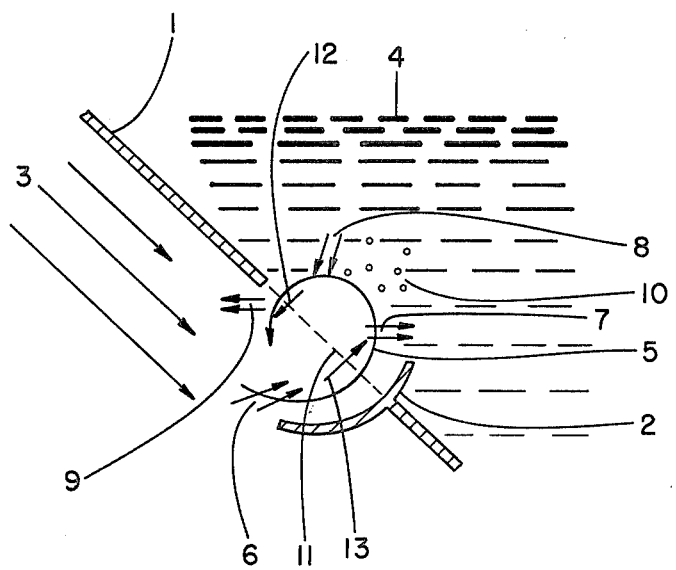
FIG. 1 schematically illustrates a sectional view through a portion of an arrangement for the separation of gas bubbles from a liquid pursuant to the invention.

Illustrated in FIG. 1 of the drawings is a rapidly flowing liquid portion 3 adjacent a slowly flowing or quiescent portion 4 and separated from the latter by a wall 1. The wall 1 is provided with an aperture whose rim defines the contact surface 11 between the two liquid portions. Generated within the aperture in the wall 1 is a vortex 5 with the aid of a deflector plate 2 which is fastened to the wall 1. The vortex 5, which distinguishes itself through intensive velocity components 12 and 13 which extend perpendicular to the contact surface 11, projects into the region of the flow 3 as well as into the relatively quiescent liquid portion 4. Due to the mass exchange between itself and the flowing liquid portion 3, the vortex takes up the bubble-laden liquid in the zone 6, conducts this as a result of the velocity component 13 through the aperture in the wall 1 and again gives this up in the region 7 within the context of the mass exchange between itself and the relatively quiescent liquid portion 4. Furthermore, within the context of the mass exchange between itself and the relatively quiescent liquid portion 4, the vortex takes up degasified liquid in the region 8, conducts the liquid through the window due to the velocity components 12 and gives the liquid up in the region 9 within the context of the mass exchange between itself and the flowing liquid portion 3. The gas bubbles which are received in the region 10 can now rise to the surface of the relatively quiescent liquid portion and naturally or spontaneously separate from the liquid. The possibility also exists that measures can be met so as to conduct away the bubbles appearing in the region 10 into a chamber in which they can spontaneously separate from the liquid. These measures are further elucidated in detail hereinbelow.

Figure 2:
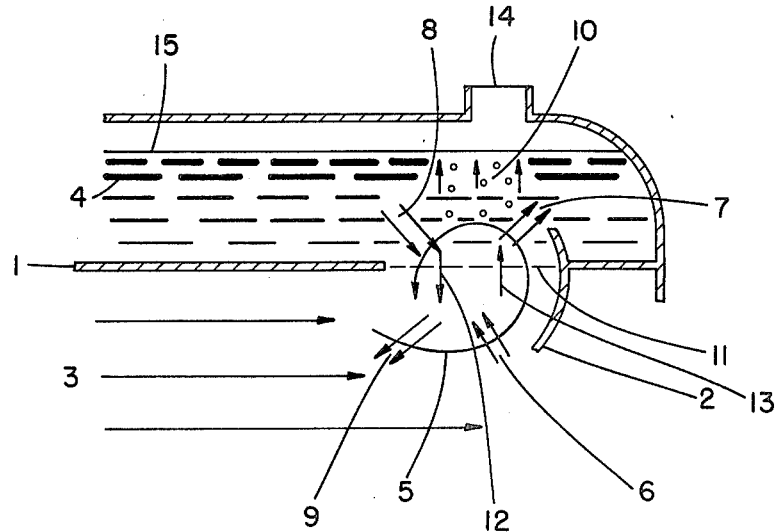
FIG. 2 shows a section through the upper portion of a cooler for the cooling circuit of a liquid-cooled internal combustion engine.

In FIG. 2 and the subsequent drawing figures, the elements which are identical or similar to each other and/or to those illustrated in FIG. 1 are designated by the same reference numerals.

As illustrated in FIG. 2 of the drawings, arranged superimposed in the upper part of a cooler for the liquid circuit of an internal combustion engine, is the flowing liquid portion 3 and the relatively quiescent liquid portion 4. The upper part of the cooler is also designated as the upper radiator. Through suitable configuration of the deflector plate 2, the vortex 5 can rotate only so rapidly that the gas bubbles contained therein can also rise upwardly opposite to the downwardly directed flow in the vortex, so as to ensure that, on the one hand, the gas bubbles rising in the relatively quiescent liquid portion 4 will rapidly separate from the vortex zone and thereby there will be reduced the tendency of conductance of the bubbles by the vortex back into the flowing liquid part 3 and, on the other hand, for a slowly revolving vortex 5 the bubbles will separate out of the entire vortex zone and rise to the surface so as to intensify the degasifying procedure.

The following possibilities are present for limiting the relatively quiescent liquid portion 4 upwardly:

When a larger volume is available through the contact surface 11, this can be imparted the role of an expansion tank in which there is found the liquid level 15 with the requirement that this liquid level does not fall below the contact surface 11 since, otherwise, gas will enter into the flowing portion 3. This possibility is illustrated in FIG. 2.

When the space which is available above the contact surface is small, then the entire space can be filled with liquid and the gas bubbles received in the region 10 or in the immediate neighborhood thereof can be conducted away through a side or overhead aperture and through a conduit which is connected to the aperture. Illustrated in FIG. 2 is an overhead aperture which is designated by the reference numeral 14.

In the arrangements of the two liquid portions 3 and 4 and of the vortex 5 as illustrated in FIGS. 1 and 2, the vortex 5 as viewed from its inception belongs to the flowing liquid portion 3, since a part of the flowing liquid portion 3 is diverted by means of the plate 2. This solution has the drawback that a part of the flowing liquid portion 3 and the energy thereof is required for the generation of the vortex 5 and that thereby through the deflector plate 2 which projects into the flow, there is reduced its flow cross-section whereby there will be produced disadvantageous effects acting on the liquid flow circuit. This drawback is avoided in the embodiment illustrated in FIG. 3, showing the construction of an upper radiator of the cooler for the liquid cooling circuit of an internal combustion engine. Assumed hereby is the condition that occurring in each liquid flow circuit are flow deflections or reversals which will produce turbulences by means of which there are sustained losses. In general, through suitable design of the installation it is attempted to hold these losses as small as possible. Inventively, there is proposed that in the region of that type of flow deflection in which such a vortex necessarily occurs, through constructional measures there be created flow conditions, such as is illustrated in FIG. 1 or 2, for the conducting away of the received gas bubbles and to thereby attain the desired goal of bubble separation, without the need to introduce additional flow hindrances and resistances such as, for instance, the deflector plate 2, into the flow circuit.

In the embodiment pursuant to FIG. 3 of the drawings, in an upper part 18 of a cooler for the cooling circuit of an internal combustion engine there is obtained a deflection of that kind in the flow through the arrangement of the liquid inlet aperture in relation to the liquid outlet apertures. Thusly, the necessarily generated vortex 5 is a secondary effect of the flow deflection. The vortex can also be designated as a secondary flow. The primary flow is then the liquid portion flowing through the upper radiator. For the conducting away of the gas bubbles received in the region 10 there is utilized a sidewise arranged connector 14a or an overhead arranged connector 14. The connectors 14 or 14a are connected to a conduit which leads to an expansion tank 16, which is arranged above the cooler.

The expansion tank 16 illustrated in FIG. 4, and the conduit which connects the expansion tank 16 with the upper portion of the cooler, are filled with stationary liquid. The entire reconveyance of degasified liquid into the flowing liquid portion is carried out in the embodiment according to FIG. 4 only on the basis of the mass exchange and the crossflow in the zone of the vortex.

The expansion tank 16 which is illustrated in FIG. 5 is connected with the cooling circuit by means of a further conduit 17. Through the further conduit 17 degasified liquid is reconveyed into the flowing liquid portion so as to effect a continual degasifying of the flowing liquid portion. In the embodiment illustrated in FIG. 5, there thus reigns a small flow through the conduit connecting the expansion tank 16 with the upper part of the cooler, through the expansion tank 16 and through the return conduit 17, in the direction indicated by the arrows. By means of this flow, a liquid-gas mixture which is extensively enriched with gas bubbles is conveyed from the upper portion of the cooler into the expansion tank 16, in which the gas bubbles will spontaneously separate out of the liquid under the effect of the buoyant force. The liquid flowing through the tank 16 represents only a small portion of the total liquid circulating through the cooling circuit so that in the tank 16 there reign the low flow velocities required for a complete separation of the gas bubbles also for small tank dimension. The liquid which is reconveyed through the conduit 17 is completely free of bubbles.

Instead of allowing the liquid to flow in the illustrated direction from the upper part 18 of the cooler into the expansion tank 16, there also exists the possibility to permit the liquid to flow in the reverse direction from the expansion tank into the upper part 18 of the cooler. The flow velocity in the conduit which connects the expansion tank 16 with the upper part 18 of the cooler must thereby be so low that the gas bubbles can still rise in opposition to the flow. However, in general, it is better that the liquid be permitted to flow in the direction illustrated in FIG. 5 of the drawings.

The inlet and outlet apertures of the expansion tank 16 may be so arranged adjacent each other that during the passage through the expansion tank 16 there is produced a flow in the tank 16 circulating about a vertical axis. The velocity of the circulating flow is so measured that sufficient time remains for the gas bubbles to rise upwardly under the effect of the buoyant force.

Figure 8:
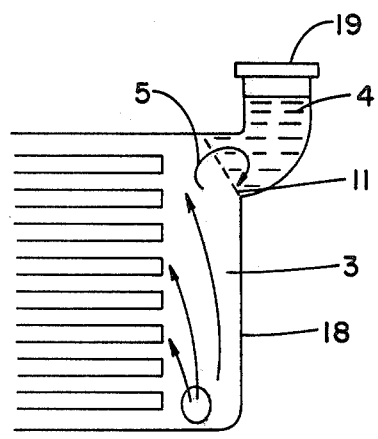
Figure 9:
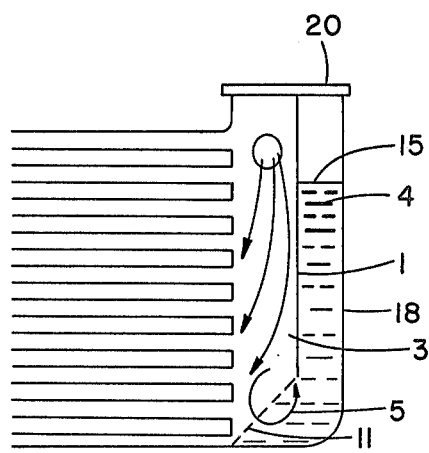

In the modified embodiments of the upper cooler part illustrated in FIGS. 6 through 10 of the drawings, the expansion tanks are presently closed off by means of a cap. In the embodiments illustrated in FIGS. 6 through 8 and 10, the cap is identified by reference numeral 19. The cap 20 in the embodiment of FIG. 9 is a combined closure for two apertures.

Figure 6:
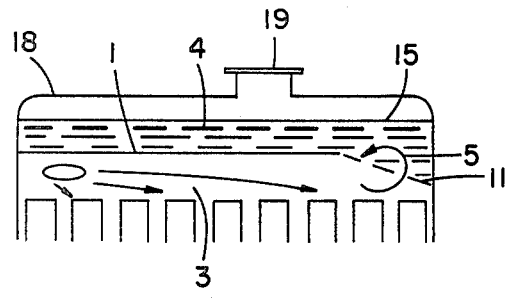
FIGS. 6 through 10, respectively, each illustrate further embodiments of the cooler which is partially illustrated in FIG. 3.
Figure 7:
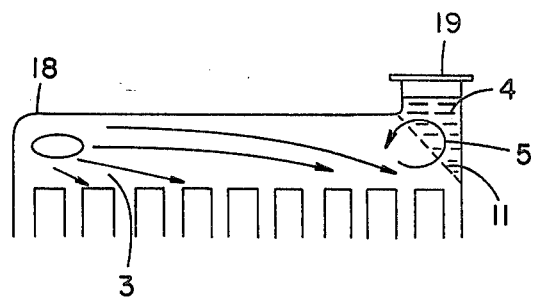
Figure 10:
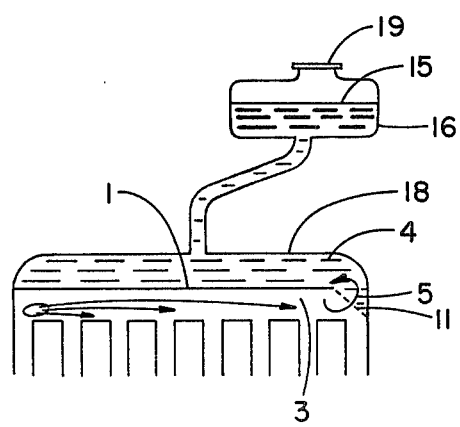

Utilized in the embodiment illustrated in FIG. 6 is a relatively large-volumed upper radiator in which the expansion volume is arranged above the separating wall 1. In the embodiment according to FIG. 7 there is utilized a horizontal radiator of low height without an expansion volume. FIG. 8 indicates a construction with an upstanding radiator of low height and without an expansion volume. In the embodiment according to FIG. 9, the radiator is large-volumed and arranged upstandingly. In this radiator the expansion volume is arranged sideways. FIG. 10 illustrates an embodiment with a horizontally arranged large-volumed radiator in which the expansion volume arranged above the separating wall 1 is enlarged by an auxiliary expansion tank 16. All described constructions of the upper cooler part have in common that the contact surface 11 is always completely covered with liquid so as to afford a satisfactory separation of the gas bubbles from the liquid.

Figure 11:
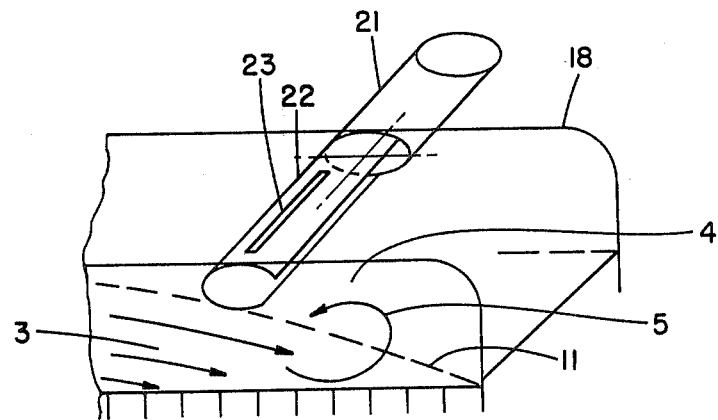
FIG. 11 is a perspective view of the cooler component of FIG. 3 in communication with a connector for the conducting away of the gas bubbles in the expansion tank.
Figure 12:
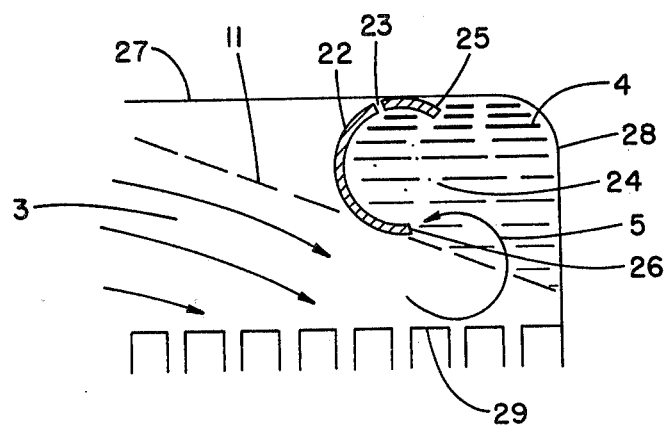
FIGS. 12 and 13, respectively, illustrate further embodiments of the connector shown in FIG. 11.
Figure 13:
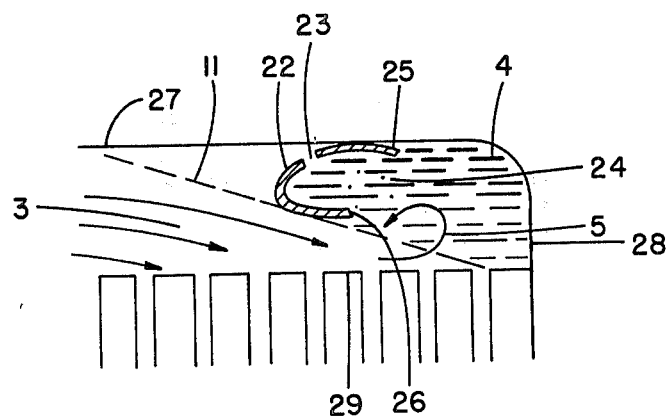

For the conducting away of the gas bubbles or of the liquid gas mixture from the region 10 for a small-volumed radiator, as illustrated in FIG. 3, a connector is preferably utilized, as illustrated in FIG. 11. This connector has a part 21 located externally of the radiator, which is provided with a circular or elliptical cross-section. The cross-section of the part 21 located externally of the radiator may also be so constructed as to provide a transition from the shape of an ellipse at the radiator into a circular shape at the connector for the connecting conduit leading to the expansion tank. The connector has a part 22 located within the radiator which is fastened to the side wall of the radiator opposite to the inlet so as to impart a high degree of mechanical rigidity to the connector. The part of the connector located within the radiator is so constructed that a cross-section has the shape of a circular segment (FIG. 12) or an elliptical segment (FIG. 13). For the two connector constructions it is valid in that the cross-section of the connector for the conducting away of the received gas bubbles is sufficiently large and that the distance between the edge 26 of the connector and the edge 29 of the outlet from the radiator is sufficiently large in order to allow for the formation of the desired flow relationships. Furthermore, the edge 26 of the connector is in the region of the perpendicular axis of the circle or of the ellipse and includes a window 24 which is open over the entire radiator width so as to facilitate the mass passage of gas and liquid. This window 24 is limited by the connector edge 25, which is arranged as closely as possible to the wall 27 of the radiator. The spacing of the connector from the wall 28 of the radiator, as well as the height of the radiator is hereby so selected that there will be obtained the desired flow relationships. Provided in the connector part extending into the radiator, is a small window 23 which has the task to conduct gas out of the radiator during the filling of the installation with liquid and for an idling installation. This window 23 is arranged as closely as possible to the wall 27 of the radiator. In its design the two following criteria must be considered:

The window is held so large whereby the gas in an idling installation can escape within a desired time period, and is so small that the desired flow pattern and the gas separation procedure will not be influenced. For this reason the window 23 is also held shorter than the width of the radiator and is arranged as closely as possible on the side wall of the radiator which is located opposite of the connector inlet.

What is claimed is:

1. Apparatus for degasifying a liquid, comprising: first and second chambers, a liquid inlet into said first chamber and a liquid outlet from said first chamber; a wall separating said chambers; an opening formed in said wall providing communication between said chambers; means for generating a vortex in said opening including an arcuate surface at the downstream end of said opening extending from both sides of said wall, wherein a flowing liquid is received in the first one of said chambers flowing parallel to and along said separating wall and a relatively quiescent liquid is contained in the second of said chambers, and said flowing liquid is deflected by said arcuate surface to form a vortex in said opening extending into the quiescent liquid to separate bubbles from the flowing liquid in the vortex into the quiescent liquid; and means in said second chamber for receiving the separated bubbles from the quiescent liquid.

2. A process for degasifying a liquid, comprising: flowing a liquid in a first chamber parallel to and along a wall separating the first chamber from a second chamber; generating a vortex in the flowing liquid by directing the flowing liquid against an arcuate surface at the downstream end of an opening in the wall communicating between said first and second chambers, said arcuate surface extending from both sides of the wall; providing a relatively quiescent liquid in said second chamber into which the generated vortex extends; and separating bubbles from the flowing liquid in the vortex into the quiescent liquid to allow the bubbles to float to the upper surface of the quiescent liquid and effecting their removal.

3. Process as claimed in claim 2, comprising reconveying said degasified liquid from said relatively quiescent liquid portion into said flowing liquid portion solely with the aid of said vortex.

* * * * *